United States Patent
Bai et al.

(10) Patent No.: US 12,536,778 B2
(45) Date of Patent: Jan. 27, 2026

(54) MODEL TRAINING BASED ON SYNTHETIC DATA

(71) Applicants: Lemon Inc., Grand Cayman, KY (US); Beijing Youzhuju Network Technology Co., Ltd., Beijing (CN)

(72) Inventors: Song Bai, Singapore (SG); Ruifei He, Beijing (CN); Shuyang Sun, Beijing (CN); Chuhui Xue, Singapore (SG); Wenqing Zhang, Singapore (SG)

(73) Assignees: LEMON INC., Grand Cayman (KY); BEIJING YOUZHUJU NETWORK TECHNOLOGY CO., LTD., Beijing (CN)

( * ) Notice: Subject to any disclaimer, the term of this patent is extended or adjusted under 35 U.S.C. 154(b) by 402 days.

(21) Appl. No.: 18/338,056

(22) Filed: Jun. 20, 2023

(65) Prior Publication Data
US 2023/0334834 A1    Oct. 19, 2023

(51) Int. Cl.
*G06V 10/774* (2022.01)
*G06T 11/60* (2006.01)
*G06V 10/764* (2022.01)

(52) U.S. Cl.
CPC ............ *G06V 10/774* (2022.01); *G06T 11/60* (2013.01); *G06V 10/764* (2022.01)

(58) Field of Classification Search
None
See application file for complete search history.

(56) References Cited

U.S. PATENT DOCUMENTS

| | | | |
|---|---|---|---|
| 11,328,436 B2 | 5/2022 | Schmidt et al. | |
| 2020/0090001 A1 | 3/2020 | Zargahi et al. | |
| 2024/0378503 A1* | 11/2024 | Montalt | G06V 10/774 |
| 2025/0005807 A1* | 1/2025 | Zhang | G06N 3/08 |
| 2025/0029289 A1* | 1/2025 | Bai | G06T 11/00 |
| 2025/0238982 A1* | 7/2025 | Burgert | G06T 5/50 |

FOREIGN PATENT DOCUMENTS

EP    3923210 A1    12/2021

\* cited by examiner

*Primary Examiner* — Dov Popovici
(74) *Attorney, Agent, or Firm* — Astute IP Law Group

(57) ABSTRACT

In model training based on synthetic data, synthetic images are generated by providing respective text prompts into a text-to-image generation model. Respective training labels associated with the synthetic images are also generated based on the used text prompts. A target model, which is configured to perform an image classification task, is trained based at least in part on the synthetic images and the associated training labels. Through this solution, a large scale of synthetic images can be automatically obtained and applicable for training a model for image classification, to improve the model performance with data-scare setting or in the case of model pre-training where the training data amount matters.

20 Claims, 5 Drawing Sheets

MODEL TRAINING BASED ON SYNTHETIC DATA

BACKGROUND

Computer vision is an integral part of various intelligent/autonomous systems in various application fields such as manufacturing, inspection, document analysis, medical diagnosis, and so on. Computer vision usually relates to a problem of how to classify images or recognize objects in the images. Machine learning models, especially deep neural networks, have been used in the computer vision fields. These models have shown promising performance in various tasks including image classification (also referred to as image recognition). The model performance highly relies on training data feed to train the models.

SUMMARY

According to implementations of the subject matter described herein, a solution for model training based on synthetic data. In this solution, synthetic images are generated by providing respective text prompts into a text-to-image generation model. Respective training labels associated with the synthetic images are also generated based on the used text prompts. A target model, which is configured to perform an image classification task, is trained based at least in part on the synthetic images and the associated training labels. Through this solution, a large scale of synthetic images can be automatically obtained and applicable for training a model for image classification, to improve the model performance with data-scare setting or in the case of model pre-training where the training data amount matters. By adopting the text-to-image generation model, the used text prompts can be naturally utilized to determine training labels for the synthetic images, without requiring additional manual labeling works.

The Summary is provided to introduce a selection of concepts in a simplified form that are further described below in the Detailed Description. The Summary is neither intended to identify key features or essential features of the subject matter described herein, nor is it intended to be used to limit the scope of the subject matter described herein.

BRIEF DESCRIPTION OF THE DRAWINGS

Through the following detailed descriptions with reference to the accompanying drawings, the above and other objectives, features and advantages of the example embodiments disclosed herein will become more comprehensible. In the drawings, several example embodiments disclosed herein will be illustrated in an example and in a non-limiting manner, where.

DETAILED DESCRIPTION

Figure 1:
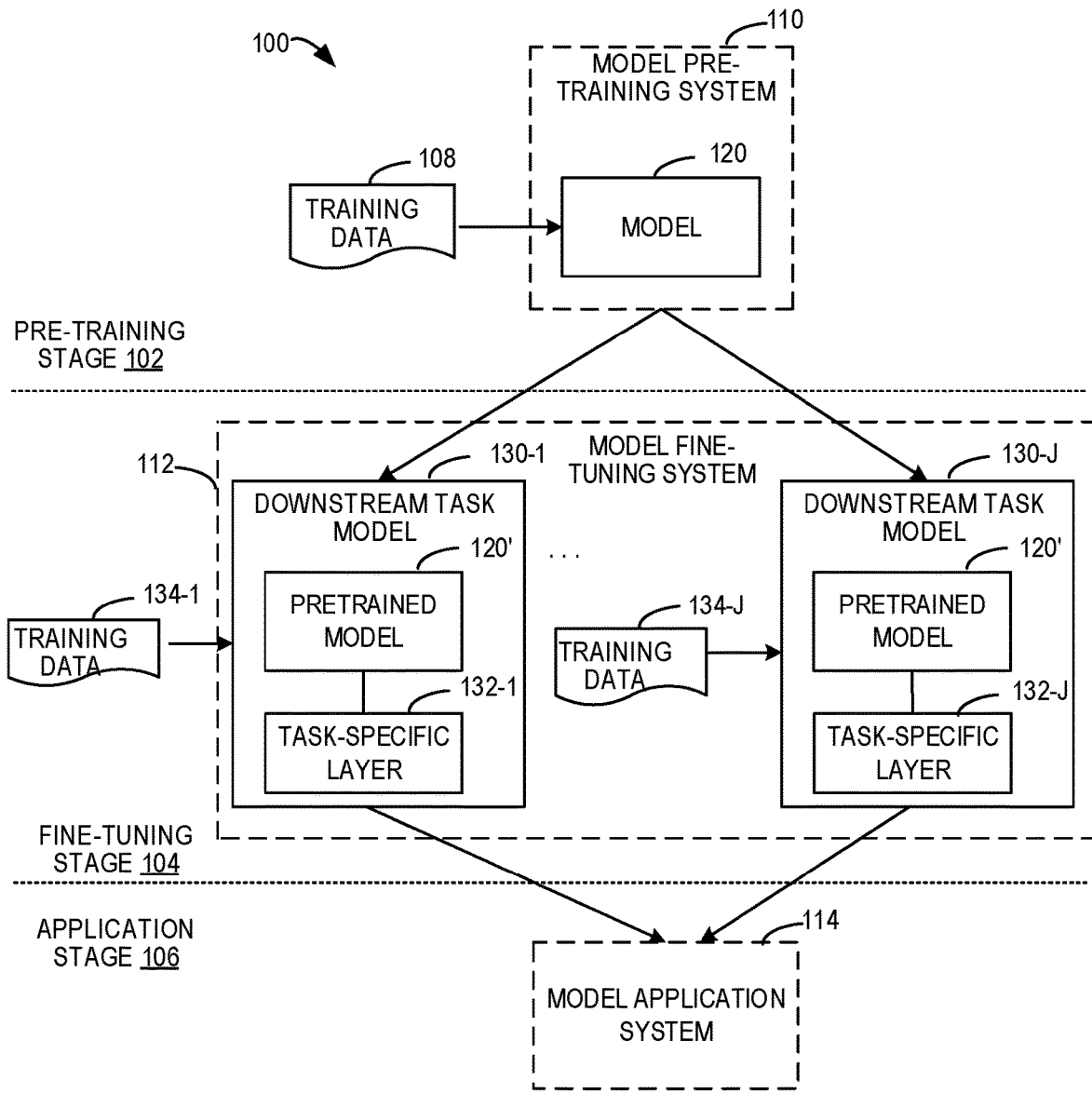
FIG. 1 illustrates a block diagram of an example environment in which various embodiments of the present disclosure can be implemented.

Principle of the present disclosure will now be described with reference to some embodiments. It is to be understood that these embodiments are described only for purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for purpose of describing particular embodiments only and is not intended to be limiting example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used herein, the term "model" is referred to as an association between an input and an output learned from training data, and thus a corresponding output may be generated for a given input after the training. The generation of the model may be based on a machine learning technique. The machine learning techniques may also be referred to as artificial intelligence (AI) techniques. In general, a machine learning model can be built, which receives input information and makes predictions based on the input information. For example, a classification model may predict a class of the input information among a predetermined set of classes. As used herein, "model" may also be referred to as "machine learning model", "learning model", "machine learning network", or "learning network," which are used interchangeably herein.

Generally, machine learning may usually involve three stages, i.e., a training stage, a validation stage, and an application stage (also referred to as an inference stage). At the training stage, a given machine learning model may be trained (or optimized) iteratively using a great amount of training data until the model can obtain, from the training data, consistent inference similar to those that human intelligence can make. During the training, a set of parameter values of the model is iteratively updated until a training objective is reached. Through the training process, the machine learning model may be regarded as being capable of learning the association between the input and the output (also referred to an input-output mapping) from the training data. At the validation stage, a validation input is applied to the trained machine learning model to test whether the model can provide a correct output, so as to determine the performance of the model. Generally, the validation stage may be considered as a step in a training process, or sometimes may be omitted. At the application stage, the resulting machine learning model may be used to process a real-world model input based on the set of parameter values obtained from the training process and to determine the corresponding model output.

FIG. 1 illustrates a block diagram of an example environment 100 in which various embodiments of the present disclosure can be implemented. In the environment of FIG. 1, three different stages are shown, including a pre-training stage 102, a fine-tuning stage 104, and an application stage 106. The pre-training stage 102 and a fine-tuning stage 104 may be both considered as a model training phase of a model. It is noted that after the pre-training stage or fine-tuning stage is completed, there can also be a test phase, which is not shown in the figure.

In the pre-training stage 102, a pre-training system 110 is configured to pre-train a machine learning model (i.e., a model 120) which can be configured to learn from training data 108 accurate representations of input data (also known as feature representations or features of the input data). Before the pre-training, parameter values of model 120 may be randomly initialized. The pre-training for the model 120 is performed with the training data 108. The parameter values of the model 120 may be updated and adjusted during the pre-training process. After the pre-training, a pre-trained model 120' may be obtained. At this time, the parameter values of the pre-trained model 120' have been updated as pre-trained parameter values. In the embodiments of the present disclosure, the pre-trained model 120' may be used as a feature extraction model, which is configured to extract a feature representation of input data.

Through the pre-training stage 102, the model 120 may learn a strong generalization capability from the large scale of training data 108. The pre-trained model 120' may be provided to a model fine-tuning system 112. The pre-trained model 120' may be fine-tuned in the model fine-tuning system 112 for one or more downstream tasks. In some example embodiments, for different downstream tasks, the pre-trained model 120' may be connected to different task-specific layers 132-1, . . . , 132-J (collectively or individually referred to as task-specific layers 132) to build different downstream task models 130-1, . . . , 130-J (collectively or individually referred to as downstream task models 132). This is because different downstream tasks require different outputs. The pre-trained model 120' may extract a feature representation of a model input and provide it to the task-specific layer 132 to generate an output for the corresponding task.

In the fine-tuning stage 104, according to the requirements of specific downstream tasks, corresponding training data 134-1, . . . , 134-J may be selected to fine tune the built downstream task models 130-1, . . . , 130-J, respectively. The corresponding model training algorithm is also adopted to update and adjust the parameters of the overall model. Since the pre-trained model 120' has learned a lot from the training data in the pre-training stage, a small amount of training data is needed in the fine-tuning stage 104 to derive a downstream task model that meets the expectation.

In some example embodiments, in the pre-training phase 102, one or more task-specific layers may have been built to pre-train the model 120 for a plurality of downstream tasks according to the requirements of the pre-training objectives. In this case, if a task-specific layer for use in a certain downstream task is the same as the task-specific layer built for the pre-training, the pre-trained model 120' and the task-specific layer may be directly used to form the corresponding downstream task model. In this case, the downstream task model may not require fine-tuning, or only require fine-tuning of a small amount of training data.

In the application phase 106, the obtained downstream task model may be provided to one or more model application systems 114 for use. In the application phase 106, each downstream task model may be used to process a corresponding input in the practical scenario and provide a corresponding output.

In FIG. 1, the model pre-training system 110, the model fine-tuning system 112, and the model application system 116 may include any computing system or device with the computing capability, such as various computing devices/systems, terminal devices, servers, and the like. Terminal devices may include any type of mobile terminal, fixed terminal or portable terminal, including mobile phone, desktop computer, laptop computer, netbook computer, tablet computer, media computer, multimedia tablet, or any combination thereof, including accessories and peripherals of these devices or any combination thereof. Servers include but are not limited to mainframe, edge computing nodes, computing devices in a cloud environment, and the like.

It would be appreciated that the components and arrangements in the environment 100 shown in FIG. 1 are only examples, and a computing system suitable for implementing the example embodiments described in the present disclosure may include one or more different components, other components, and/or different arrangements. For example, although being illustrated as separate systems, the model pre-training system 110, the model fine-tuning system 112, and the model application system 116 may be integrated in the same system or device. The embodiments of the present disclosure are not limited in this regard. The example embodiments of the model training and model application will be further described with reference to the accompanying figures.

Deep learning powered by large-scale annotated data has revolutionized the field of image classification. However, it is costly and time-consuming to manually collect a larges-cale labeled dataset. In addition, recent concerns about data privacy and usage rights further hinder this process. In parallel, generative models that aim to model real-data distributions can now produce high-fidelity photo-realistic images. In particular, recent generative models have made major breakthroughs in synthesizing multi-modal data. In view of this, the inventors have found that synthetic data from generative models is a good data source for computer vision tasks, including the image classification tasks.

According to embodiments of the present disclosure, there is proposed an improved solution for model training. In this solution, synthetic images are generated by providing respective text prompts into a text-to-image generation model. Respective training labels associated with the synthetic images are also generated based on the used text prompts. A target model, which is configured to perform an image classification task, is trained based at least in part on the synthetic images and the associated training labels. Through this solution, a large scale of synthetic images can be automatically obtained and applicable for training a model for image classification, to improve the model performance with data-scare setting or in the case of model pre-training where the training data amount matters. By adopting the text-to-image generation model, the used text prompts can be naturally utilized to determine training labels for the synthetic images, without requiring additional manual labeling works.

Some example embodiments of the present disclosure will be described in detail below with reference to the accompanying figures.

Figure 2:
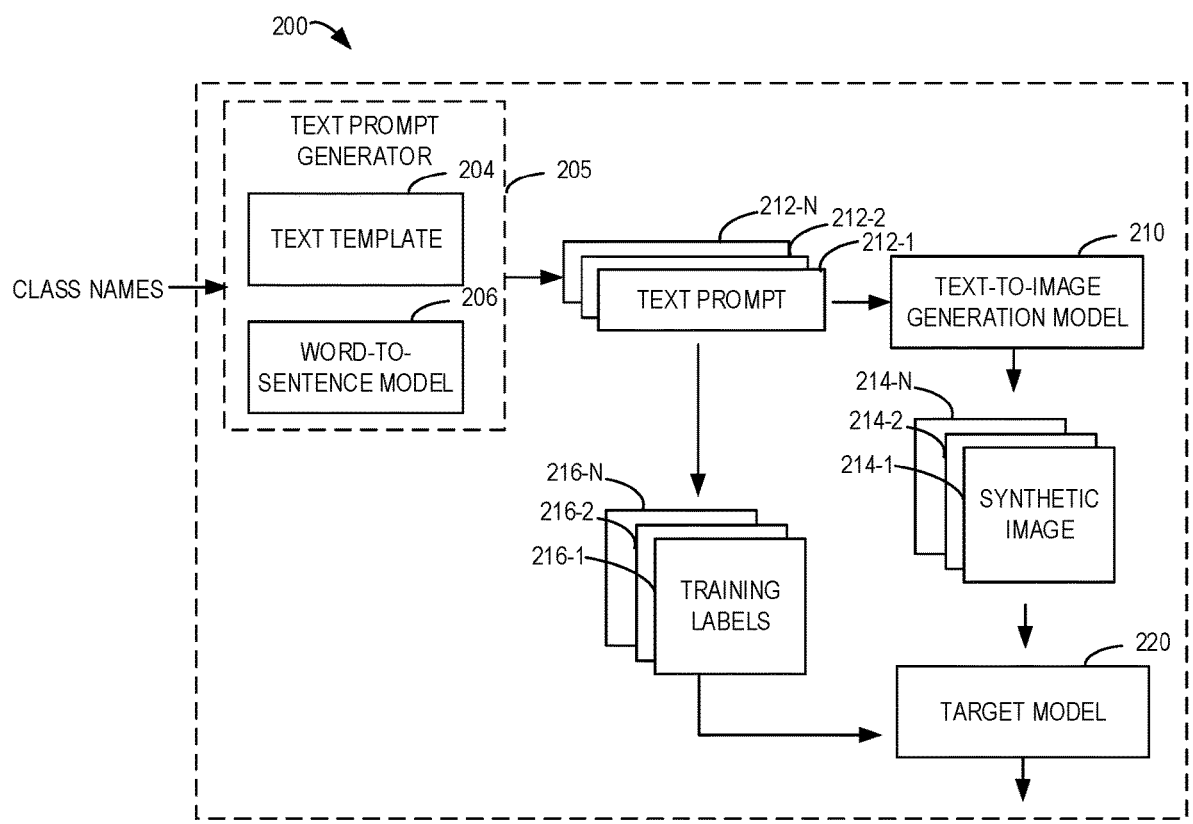
FIG. 2 illustrates a block diagram of a model training system in accordance with some example embodiments of the present disclosure.

Reference is first made to FIG. 2. FIG. 2 illustrates a block diagram of a model training system 200 in accordance with some example embodiments of the present disclosure. As sill be discussed below, the model training system 200 is configured to train a target model 220 which is configured to perform an image classification task. In some example embodiments, the model training system 200 may be implemented as either or a combination of the model pre-training system 110 and the model fine-tuning system 120 in the environment 100.

The model training system 200 uses a text-to-image generation model 210 for synthetic data generation. The text-to-image generation model 210 is a generative model for image generation. The input to the text-to-image generation model 210 is a text prompt which describes the expected image to be generated. The output from the text-to-image generation model 210 is an image corresponding to the text prompt. In particular, the text-to-image generation can be treated as a conditional image generation task that requires the sampled image to match the given natural language description. The text-to-image generation model 210 can be used as an efficient means for synthetic data representation, to produce high-fidelity photorealistic images closer to real data since they are trained on real-world data and can also produce potentially unlimited synthetic data size. The generated images are highly condensed compared to synthetic data itself, and take up much reduced storage space.

There are various text-to-image generation models to be adopted. In some example embodiments, the text-to-image generation model 210 may be a text-to-image diffusion model. Diffusion models are a class of generative models. As a likelihood-based model, the diffusion model matches the underlying data distribution $q(x_0)$ by learning to reverse a noising process, and thus novel images can be sampled from a prior Gaussian distribution via the learned reverse path. Diffusion models can be utilized for both unconditional and conditional image synthesis, with high sample quality, good mode coverage and promising training stability. In some example embodiments, the text-to-image generation model 210 may be selected as other types of generative models such as a Generative Adversarial Networks (GAN)-based generator.

The model training system 200 provides each of a plurality of text prompts 212-1, 212-2, ..., 212-N (collectively or individually referred to as text prompts 212) into the text-to-image generation model 210, so as to generate a plurality of synthetic images 214-1, 214-2, ..., 214-N (collectively or individually referred to as synthetic images 214). The model training system 200 further generates respective training labels 216-1, 216-2, ..., 216-N to be associated with the plurality of synthetic images 214 based on the plurality of text prompts 212. For the purpose of discussion, the training labels 216-1, 216-2, ..., 216-N are collectively or individually referred to as text prompts 212. In some example embodiments, the training labels 216-1, 216-2, ..., 216-N may be determined as the text prompts 212, or the specific classes corresponding to the text prompts 212.

The model training system 200 performs training of a target model 220, which is configured to perform an image classification task, based at least in part on the plurality of synthetic images 214 and the associated training labels. As will be discussed below, in some example embodiments, the target model 220 to be trained may be a pre-trained model and the training here is to fine-tune the pre-trained model; in some other embodiments, the training here is to pre-train the target model 220 from scratch.

The image classification task may be configured to distinguish between a plurality of classes (e.g., k classes) with a plurality of class names. In this case, the associated training labels 216 or the text prompts 212 at least indicate the plurality of class names. Concretely, for a k-way classification, there may be k class names $C=\{c_1, \ldots, c_k\}$, the text prompts 212 may be generated from the k class names. The model training system 200 comprises a text prompt generator 205 to generate the text prompts 212 from the k class names.

In some example embodiments, the text prompt generator 205 may generate one or more text prompts 212 by filling one or more class names into a text template 204. For example, a text prompt 212 $s_i$ corresponding to a class name $c_i$ may be generated as $s_i$="a photo of a $\{c_i\}$". In some example embodiments, more than one text template may be defined to generate more than one text prompt for a class name.

In some example embodiments, considering that only using the label names as inputs might limit the diversity of synthesized images and cause bottlenecks for validating the effectiveness of synthetic data, the text prompt generator 205 may alternatively or in addition, the text prompt generator 205 to increase the diversity of text prompts and the generated synthetic images, so as to achieve language enhancement (LE) and to better unleash the potential of synthesized data. The text prompt generator 205 may generate one or more text prompts 212 by providing one or more class names into a trained word-to-sentence model 206, to obtain at least one text prompt 212 generated by the word-to-sentence model 206. The word-to-sentence model 206 can generates diversified sentences containing the class names as language prompts for the text-to-image generation process. For example, if the class name is "airplane", then the enhanced text prompt from the word-to-sentence model 206 may be "a white airplane hovering over a beach and a city". The enhanced text descriptions introduce rich context descriptions in the text prompts 212. In some example embodiments, for a class name, one or more text prompts 212 may be generated by the word-to-sentence model 206, for example, by providing the class name into the word-to-sentence model 206 for more than one time.

In some example embodiments, the target model 220 is a pre-trained model and the image classification task is a downstream task for the pre-trained model. In the model setup stage, for example, the target model 220 may comprise an image encoder g and a classifier (with classifier weights W). The multi-modal model for text and image may be pre-trained, such as a CLIP model, which comprise a text encoder h and an image encoder g. The text prompts 212 $s_i$ may be input into the text encoder h to obtain text features $h(s_i)$. Then the text features $h(s_i)$ may be used to construct the classifier weights $W \in R^{d \times k}$, where d is the dimension of text features, and k is the number of class names. The combination of the image encoder g with the classifier weights W may provide a pre-trained target model 220 for a downstream task of image classification, represented as $f(x)=g(x)^T W$.

In some example embodiments, the pre-trained target model 220 may be configured with zero-shot setting or few-shot setting for the plurality of classes in the image classification task. In this case, the model training system 220 may fine-tune the pre-trained target model 220 based on the plurality of synthetic images 214 and the associated training labels 216. In the zero-shot setting or few-shot setting, the k class names are new classes to the training data for pre-training the target model 220. The zero-shot setting or few-shot setting is generally applied in the data-scarce situations.

Zero-shot setting (or zero-shot learning) refers to a situation where a class has never been seen before but some semantic descriptions of the class is available. That is, no real images (or referred to as non-synthetic images) in this class is available for training. The objective of the fine-tuning is to recognize the class based on the semantic descriptions. Regarding few-shot setting (or few-shot learning), the same aims to recognize new classes when provided with one or a few labeled real images of these classes. Considering the scarce real images for zero-shot setting or few-shot setting, in embodiments of the present disclosure, given a label space for the zero-shot or few-shot task (i.e., given the k class names), the text-to-image generation model 210 is utilized to generate synthetic images 214 given the class names.

In some example embodiments, for the zero-shot setting where no real training images of the target classes are available, a multi-modal model may be pre-trained with large-scale image-caption pairs, and the similarities between paired image features (from an image encoder g) and text features (from a text encoder h) are maximized during pre-training. The pre-trained feature extractor, i.e., the image encoder g and the text encoder h, can then be used to solve zero-shot downstream tasks where given an image, its feature from the image encoder g are compared with text features of different classes from the text encoder h and the image is further assigned to the class that has the largest similarity in the text-image feature space of the pre-trained model. In the fine-tuning stage, the target model 220 is constructed as a combination of the image encoder g with the classifier weights W. The paired training labels 216 and synthetic images 214 are employed to fine-tune the target model 220 with the feature extractor frozen.

In this way, as compared with the traditional way of zero-shot learning, labeled training data of synthetic images corresponding to the new classes can become available for model fine-tuning. The target model 220 may outperform the traditional model for the zero-shot learning.

In some example embodiments, to avoid data noise in the pre-training data of the target model 220 or the label space mismatch between pre-training and the zero-shot task, as compared of only using the label names as inputs, the diversity of synthetic images 214 is improved by applying the word-to-sentence model 206 for text prompt generation, as discussed above.

Further, in some example embodiments, to reduce noise and enhance robustness, the synthetic images 214 generated from the text-to-image model 210 may be filtered to remove low-quality samples. This is even more severe in the setting with language enhancement as it may introduce undesired items into text prompts. Hence, an image filter strategy is introduced to rule out the low-quality samples. Specifically, the model training system 220 may determine respective quality scores of the plurality of synthetic images 214 and filter the plurality of synthetic images 214 based on the determined respective quality scores, to discard at least one of the plurality of synthetic images 214. In some example embodiments, the quality scores of the synthetic images 214 may be assessed by a pre-trained image classification model, e.g., the pre-trained target model 220 with the zero-shot setting. The output of the pre-trained image classification model for a synthetic image 214 is a classification confidence given by this model for the synthetic image 214. Then the synthetic images 214 with the low classification confidences (e.g., lower than a threshold or a predetermined percentage of images with low confidences) may be removed. The remaining synthetic images 214 and their associated training labels 216 are then used to fine-tune the pre-trained target model 220 with zero-shot setting.

In some example embodiments, as soft-target is more robust than hard-target in countering sample noise, the model training system 200 may fine-tune the target model using a soft cross-entropy (SCE) loss function. In the SCE loss function, the normalized scores can be used as a target may be used to enhance robustness against data noise.

To validate the performances of using synthetic images for model fine-tuning with zero-shot setting, the inventors have selected a number of diverse datasets covering object-level (CIFAR-10 and CIFAR-100, Caltech101, Caltech256, ImageNet), scene-level (SUN397), fine-grained (Aircraft, Birdsnap, Cars, CUB, Flower, Food, Pets), textures (DTD), satellite images (EuroSAT) and robustness (ImageNetSketch, ImageNet-R) for zero-shot image classification. Table 1 shows the main results on zero-shot image classification.

TABLE 1

Main results on zero-shot image classification

| Dataset | Task | CLIP-RN50 | CLIP-RN50 + SYN | CLIP-ViT-B/16 | CLIP-ViT-B/16 + SYN |
|---|---|---|---|---|---|
| CIFAR-10 | o | 70.31 | 80.06 (+9.75) | 90.80 | 92.37 (+1.57) |
| CIFAR-100 | o | 35.35 | 45.69 (+10.34) | 68.22 | 70.71 (+2.49) |
| Caltech101 | o | 86.09 | 87.74 (+1.65) | 92.98 | 94.16 (+1.18) |
| Caltech256 | o | 73.36 | 75.74 (+2.38) | 80.14 | 81.43 (+1.29) |
| ImageNet | o | 60.33 | 60.78 (+0.45) | 68.75 | 69.16 (+0.41) |
| SUN397 | s | 58.51 | 60.07 (+1.56) | 62.51 | 63.79 (+1.28) |
| Aircraft | f | 17.34 | 21.94 (+4.60) | 24.81 | 30.78 (+5.97) |
| Birdsnap | f | 34.33 | 38.05 (+3.72) | 41.90 | 46.84 (+4.94) |
| Cars | f | 55.63 | 56.93 (+1.30) | 65.23 | 66.86 (+1.63) |
| CUB | f | 46.69 | 56.94 (+10.25) | 55.23 | 63.79 (+8.56) |
| Flower | f | 66.08 | 67.05 (+0.97) | 71.30 | 72.60 (+1.30) |
| Food | f | 80.34 | 80.35 (+0.01) | 88.75 | 88.83 (+0.08) |
| Pets | f | 85.80 | 86.81 (+1.01) | 89.10 | 90.41 (+1.31) |
| DTD | t | 42.23 | 43.19 (+0.96) | 44.39 | 44.92 (+0.53) |
| EuroSAT | si | 37.51 | 55.37 (+17.86) | 47.77 | 59.86 (+12.09) |
| ImageNet-Sketch | r | 33.29 | 36.55 (+3.26) | 46.20 | 48.47 (+2.27) |
| ImageNet-R | r | 56.16 | 59.37 (+3.21) | 74.01 | 76.41 (+2.40) |
| Average | / | 55.13 | 59.47 (+4.31) | 65.42 | 68.32 (+2.90) |

All results are top-1 accuracy on the test dataset. In the Task column, "o" represents object-level, "s" represents scene-level, "f" represents fine-level, "t" represents textures, "si" represents "satellite images", and "r" represents "robustness". In Table 2, "CLIP-RN50" and "CLIP-ViT-B/16" are two baseline models with zero-shot setting, which are pre-trained on real labeled images and have no image available for the new classes for image classification. "CLIP-RN50+SYN" and "CLIP-ViT-B/16+SYN" represents the enhanced models with the introduction of synthetic images of the new classes in the zero-shot setting.

As can be seen from Table 1, on 17 diverse downstream zero-shot image classification datasets, a remarkable average gain of 4.31% is achieved for CLIP-RN50 and 2.90% for CLIP-ViT-B/16 in terms of top-1 accuracy. Significantly, on the EuroSAT dataset, the largest performance boost of 17.86% is achieved for CLIP-RN50 in top-1 accuracy. It is noted that the performance gain brought by synthetic data varies differently across datasets, which is mainly related to GLIDE's training data distribution. The training data distribution of the text-to-image generation model GLIDE would exhibit bias and produce different domain gaps with different datasets.

It would be appreciated that Table 1 provides some example results on the zero-shot image classification which is shown for the purpose of illustration only without suggesting any limitations to the embodiments of the present disclosure. Depending on the datasets, the model setup, and the model training strategies, the results may be varied.

In some examples, some example results on different strategies for the model fine-tuning with synthetic images according to some embodiments of the present disclosure. In Table 2, "B" represents a basic (B) strategy according to some embodiments of the present disclosure where the class names are used to build the text prompts (using a text template) and generate corresponding synthetic images; "LE" represents a language enhancement (LE) strategy according to some embodiments of the present disclosure where the text-to-sentence model is applied to enrich diversity of the text prompts; and "LE+CF" represents the LE strategy combined with a CLIP filter strategy according to some embodiments of the present disclosure where the low-quality synthetic images are ruled out; and "SCE" represents a soft cross-entropy (SCE) with the use of the SCE loss function in fine-tuning.

TABLE 2

Example results on different strategies in the present disclosure

| Dataset | Base line | B | | LE | | LE + CF | |
|---|---|---|---|---|---|---|---|
| | | CE | SCE | CE | SCE | CE | SCE |
| CIFAR-10 | 70.31 | 77.39 (+7.08) | 78.23 (+7.92) | 77.20 (+6.89) | 77.55 (+7.24) | 80.01 (+9.70) | 80.06 (+9.75) |
| CIFAR-100 | 35.35 | 43.99 (+8.64) | 44.25 (+8.90) | 44.08 (+8.73) | 44.91 (+9.56) | 44.55 (+9.20) | 45.69 (+10.34) |
| EuroSAT | 37.51 | 45.64 (+8.13) | 48.23 (+10.72) | 53.26 (+15.75) | 54.94 (+17.43) | 54.75 (+17.24) | 55.37 (+17.86) |

As can be seen from Table 2, by introducing more linguistic context into the text input, the LE strategy helps increase the diversity of synthetic data. As shown in Table 2, LE strategy can achieve additional performance gains upon the B strategy in most cases, which demonstrates the efficacy of the LE strategy and the importance of synthetic data diversity for zero-shot classification. Further, with the CF strategy to filter out unreliable samples, the LE+CF strategy yields consistent improvement upon the B strategy. Moreover, the SCE strategy generally achieves better performance than the CE strategy, showing its better adaptation to label noise.

In some example embodiments, in the fine-tuning of the pre-trained target model 220, as mentioned above, the classifier is fine-tuned with the image encoder frozen. It is shown that this fine-tuning strategy can provide optimal performance. As shown in Table 3, different proportions of the full model parameters on synthetic data for a same test dataset (0.02% corresponds to the default case where only the classifier is tuned) and the zero-shot performance on the test dataset is reported. The best results are obtained by only tuning the classifier, and the performance gradually decreases as more parameters in the image encoder are gradually incorporated for optimization, which agrees with the traditional strategy. For understanding why synthetic data may harm pre-trained image encoder, the inventors also set experiments with real-world data with domain shifts and find they behave similarly to synthetic data, which suggests that domain gap is the main reason for the phenomenon. Thus, the synthetic data may have a better chance to overcome domain shifts in comparison with real-world data since the label space of the synthetic data can be customized and kept in line with the down-stream dataset and use strategies during synthesizing to alleviate domain shifts.

TABLE 3

Parameters tuned vs. Accuracy

| Param Tuned (%) | 0 | 0.02 | 0.04 | 62.50 | 64.06 | 69.53 | 82.81 | 92.19 |
|---|---|---|---|---|---|---|---|---|
| Acc. | 37.51 | 55.37 | 55.11 | 55.28 | 54.56 | 54.34 | 53.63 | 52.09 |

In some examples, to exclude the influence of powerful initialization of the pre-trained model in the model fine-tuning based on synthetic data, the inventors also conduct a from-scratch setting on the CIFAR-100 dataset, where a ResNet-50 model is optimized from random initialization. Given the label space of the CIFAR-100 dataset (which has 100 new classes), a synthetic dataset of 50 k (500 images per class) is generated to train a ResNet-50 model from scratch for image classification. A performance of 28.74% top-1 accuracy on CIFAR-100 test dataset is achieved, which is much lower than the performance of the pre-trained CLIP model (see Table 1). This might be attributed to the quality and diversity of data. The CLIP model benefits from diverse real-world data. Further, it is to investigate how many real in-domain training data can match the performance of our 50 k synthetic data. As shown in Table 4, training with the synthetic images per class (95×100=9.5 k) will achieve comparable performance as that of 50 k synthetic data. This manifests that synthetic data are not as efficient and effective as real data when solving downstream tasks. It requires around 5 times more data in order to achieve a comparable performance as that of real data. Note that it is found further increasing the amount of synthetic data will not deliver further performance gains for the downstream classification task.

TABLE 4

Setting when training from scratch

| Real shot | 1 | 16 | 32 | 64 | 80 | 90 | 95 | 100 |
|---|---|---|---|---|---|---|---|---|
| Acc. | 2.48 | 10.4 | 14.95 | 21.96 | 24.4 | 25.52 | 27.99 | 29.95 |

Through the above experiments and result analysis, it can be appreciated that current synthetic data from text-to-image generation models could indeed bring significant performance boosts for a wide range of zero-shot image classification tasks, and is readily applicable with carefully designed strategies such as large-scale pre-trained models. Diversity and reliability matter for synthetic data when employed for zero-shot tasks. When the model is trained from scratch with synthetic data, synthetic data cannot deliver satisfactory performance and are much less data-efficient and effective for solving the classification task in comparison with real data.

The zero-shot setting in the case of a pre-trained model has been discussed above. Some embodiments of the few-shot setting will be further discussed below. In the few-shot setting, for the image classification task, there may be a number of non-synthetic images with associated training labels. In an k-way M-shot case, M non-synthetic images (also referred to as real images) are given for each of the k classes. In this case, there may be a total of k×M real training samples for the fine-tuning of the target model 220. In some example embodiments, M may be 1, 2, 4, 8, 16 or any other number. In the embodiments of the present disclosure, synthetic images 214 in the k classes are generated and the associated training labels 216 are obtained. The target model 220 may then be fine-tuned with the synthetic images 214 and the training labels 216, as well as the non-synthetic images and the associated training labels.

In some example embodiments, in the fine-tuning of the target model 220 with few-shot setting, the basic (B) strategy in the zero-shot setting may be applied. In some example embodiments, as the few-shot real samples can provide useful information on the data distribution of the classification task, two new strategies may be developed by leveraging the in-domain few-shot real data for better using synthetic data.

In a first strategy, referred to as a real filtering (RF) strategy, given the synthetic images of one class $c_i$, the features of few-shot non-synthetic images to filter out synthetic images whose features are very close to the features of real non-synthetic images that belong to other classes different from the class $c_i$. For example, for a first synthetic image associated with a first class, a first feature similarity between the first synthetic image and a first non-synthetic image in the first class is determined and a second feature similarity or similarities between the first synthetic image and a second non-synthetic image(s) in a second class other than the first class is also determined. If a second feature similarity is higher than the first feature similarity, which means that the first synthetic image is much closer to the second class than to the first class, then the first synthetic image is discarded. In this way, low-reliable synthetic images in a class can be filtered out.

In a second strategy, referred to as a real guidance (RG) strategy, in the case where the text-to-image generation model 210 is a diffusion model, the few-shot real samples are used as guidance to generate synthetic images where the few-shot real samples (added noise) replace the random noise at the beginning of the generation to guide the diffusion process. The synthetic images 214 may be generated by further providing the non-synthetic images for the plurality of classes into the diffusion model as guidance information.

Figure 3A:
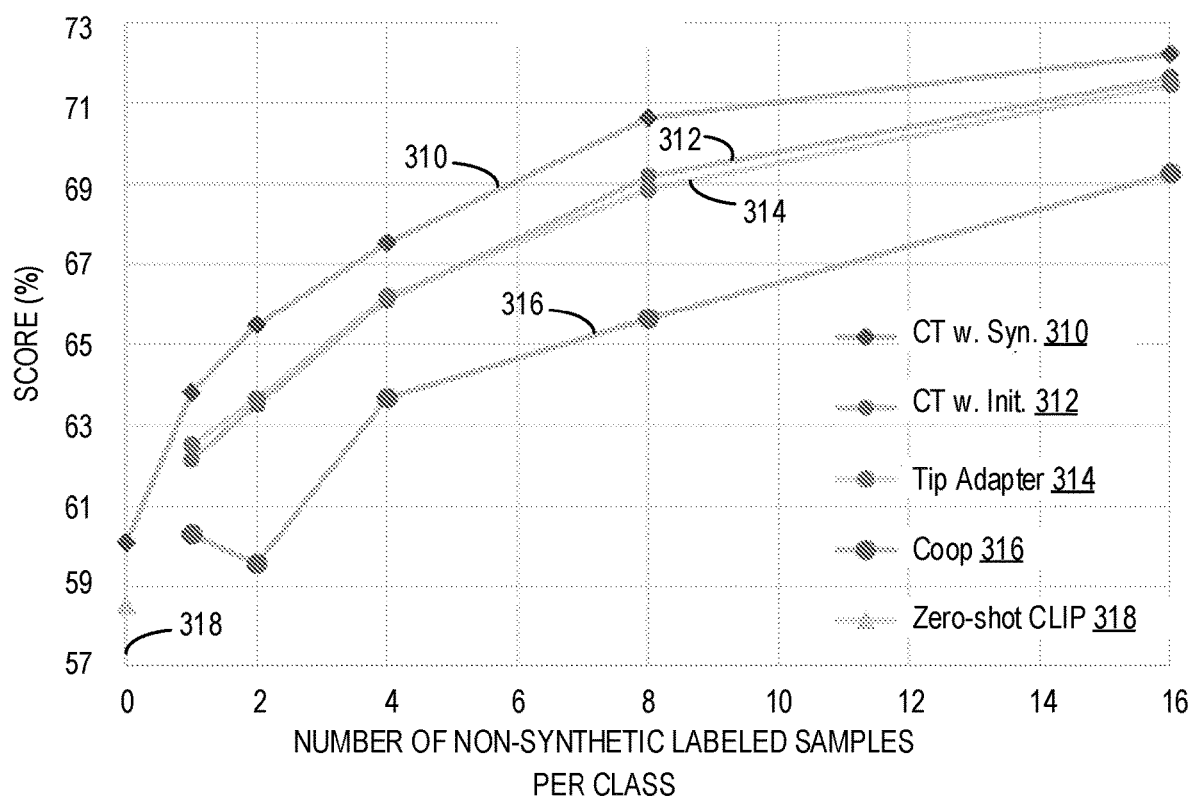
FIG. 3A and FIG. 3B illustrate example results for few-shot image classification in accordance with some example embodiments of the present disclosure.
Figure 3B:
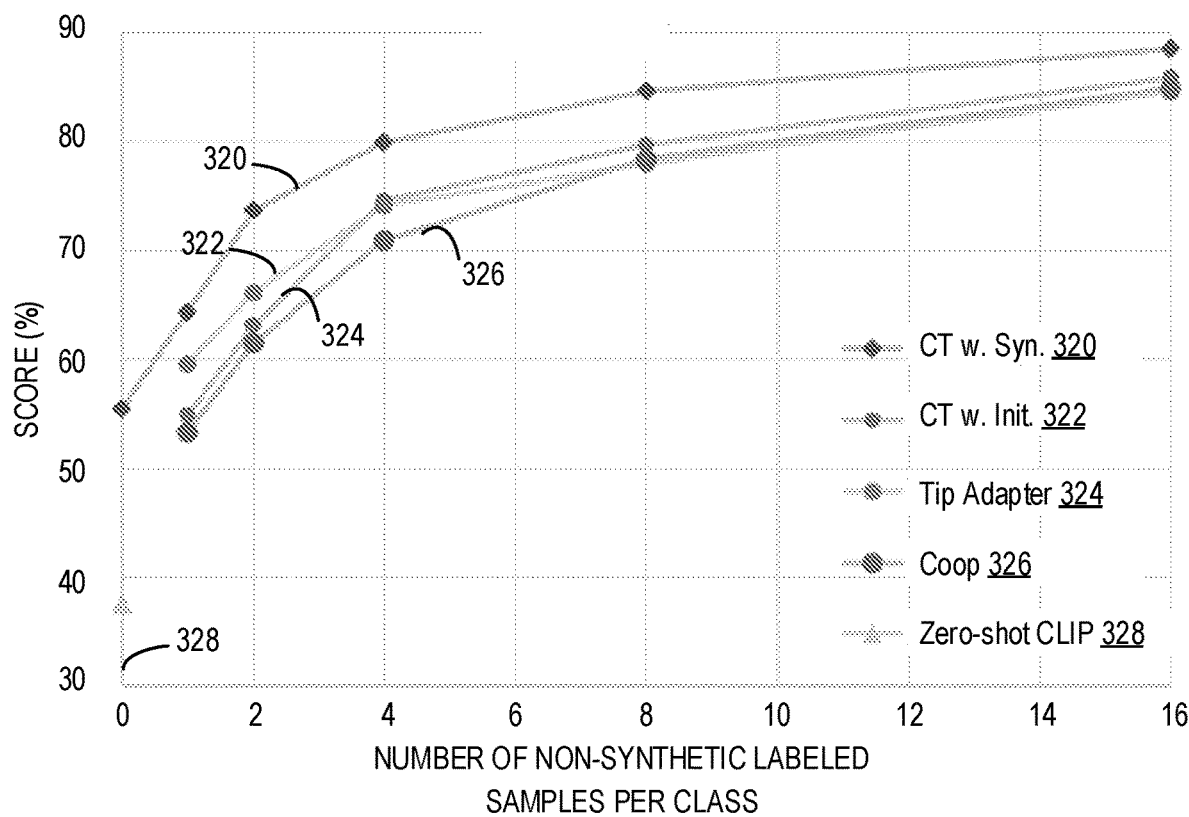

To validate the performances of using synthetic images for model fine-tuning with few-shot setting, the inventors have selected a number of diverse classification datasets for few-shot learning. FIG. 3A and FIG. 3B illustrate example results for few-shot image classification performed on two datasets (SUN397 and EroSAT), respectively. In these examples, the pre-trained target model 220 is constructed from a pre-trained CLIP model.

As shown in FIG. 3A, with only few-shot real images for training in the dataset SUN397, according to the curve 310 of performance scores over non-synthetic image number for a CT with initial strategy (classifier weights initialized from CLIP text embeddings) in accordance with some embodiments of the present disclosure, the CT with initial strategy performs comparably with the state-of-the-art CLIP tuning methods, Zero-shot CLIP, Tip Adapter and CoOp (corresponding to the curves 314, 316 and 318, respectively). The CT with synthetic strategy represents the results of applying synthetic data with mix training, real image as guidance, and freezing BN strategies according to some embodiments of the present disclosure. With the help of generated synthetic images, as can be seen from the curve 312 of the CT with synthetic strategy, the CT with synthetic strategy achieves noticeable performance gains upon the CT with initial strategy, and achieves a new state-of-the-art few-shot learning performance across different datasets.

Similar results are observed from FIG. 3B, with only few-shot real images for training in the dataset SUN397, the curve 320 for the CT with initial strategy according to some embodiments of the present disclosure performs comparably with the state-of-the-art CLIP tuning methods, Zero-shot CLIP, Tip Adapter and CoOp (corresponding to the curves 314, 316 and 318, respectively). The curve 312 of the CT with synthetic strategy also shows noticeable performance gains upon the CT with initial strategy, and achieves a new state-of-the-art few-shot learning performance across different datasets.

Thus, for data-scarce few-shot classification, synthetic data could help address the insufficient data problem to boost performance. It is noted that the boost from synthetic data gradually diminishes as the real shot number increases, this is because the effectiveness of each sample in real data is high since there is no domain gap; in contrast, synthetic data suffer from domain gaps and perform less efficiently. In addition, the positive effects of the few-shot real data may overlap with that of synthetic data. Thus, with the increase of real data, the overlapping becomes serious and the positive impacts of synthetic data are reduced.

It would be appreciated that FIGS. 3A-3B provide some example results on the few-shot image classification which is shown for the purpose of illustration only without suggesting any limitations to the embodiments of the present disclosure. Depending on the datasets, the model setup, and the model training strategies, the results may be varied.

In some examples, some example results on different strategies for the model fine-tuning with synthetic images according to some embodiments of the present disclosure. In Table 5, "B" represents a basic (B) strategy according to some embodiments of the present disclosure where the class names are used to build the text prompts (using a text template) and generate corresponding synthetic images; "RF" represents the real filtering strategy with the non-synthetic images used to filter out some low-quality synthetic images; and "RG" represents the real guidance strategy with the non-synthetic images used as guidance information for generating the synthetic images.

TABLE 5

Example accuracy results on different strategies in the present disclosure

| B | RF | RG |
|---|----|----|
| 87.1 | 87.33 | 88.47 |

As shown in Table 5, both the RF strategy and the RG strategy provide performance gains upon the B strategy which is the best strategy in the zero-shot setting. This demonstrates the importance of utilizing the domain knowledge from few-shot images for preparing the synthetic data. Further, the RG strategy significantly outperforms the RF strategy, yielding the best performance. This shows utilizing real data as guidance of the diffusion process help reduce the domain gap.

In some example embodiments, the pre-trained model target model 220 may comprise at least one batch normalization (BN) layer. During the fine-tuning, the pre-trained model target model 220 may be fine-tuned with the at least one BN layer frozen. Table 6 shows example accuracy results in embodiments with/without BN layers frozen.

TABLE 6

Example accuracy results in embodiments with/without BN layers frozen

| Training data | Freeze BN? | Test Acc |
|---|---|---|
| Real data | N | 75.31 |
| Real data | Y | 85.63 |
| Synthetic data | N | 44.73 |
| Synthetic data | Y | 55.37 |

As shown in Table 6, for both real and synthetic data, freezing the BN layers yields much better performance. For real data, it is hard to get a good estimation of BN statistics when the number of images is limited. As for synthetic data, the statistical difference between different domains can provide good attribution. Hence, freezing the BN layers during tuning for few-shot settings can achieve better performance.

In the few-shot learning, there are two parts of data, i.e. few-shot real data and synthetic data. In some example embodiments, a phase-wise training procedure may be applied to fine-tune the target model 220 with each part of data in two phases. In a first phase of the phase-wise training procedure, the non-synthetic images may be used for training, and in a second phase of the phase-wise training procedure, the synthetic images being used for training. In some examples, the first phase may be performed before the second phase. In some examples, the second phase may be performed before the first phase. In some other embodiments, a mix-training procedure may be applied to fine-tune the target model 220. The non-synthetic images and the synthetic images may be mixed for training. For example, two parts of data may be simultaneously utilized to update the model in each iteration.

Some example results for the phase-wise and mix training are provided in Table 7. As can be seen, under different shot number settings, mix training performs consistently better than two phase-wise strategies. The mix training can help learn better classifiers since each part can function as a regularization for the other: synthetic data help alleviate instabilities brought by limited real samples, and real data help address the noise and domain gap of synthetic data.

TABLE 7

Example results for the phase-wise and mix training

| | Phase-wise | | Mix |
|---|---|---|---|
| M-shot | syn→real | real→syn | training |
| 1 | 63.01 | 63.32 | 64.36 |
| 2 | 72.24 | 72.85 | 73.62 |
| 4 | 78.88 | 79.21 | 79.88 |
| 8 | 83.64 | 83.99 | 84.57 |
| 16 | 87.10 | 87.44 | 88.47 |

Through the above experiments and result analysis, it can be appreciated that synthetic data from text-to-image generation models could readily benefit few-shot learning and achieve a new state-of-the-art few-shot classification performance with strategies according to the embodiments of the present disclosure.

In the above-described embodiments, the synthetic images 214 are utilized for fine-tuning the pre-trained target model 220. In some example embodiments, the synthetic images 214 may be utilized to pre-train the target model 220 for transfer learning. In this case, the image classification task is a downstream task after the pre-training. Since data amount and diversity play important roles in model pre-training, in some example embodiments, the synthetic data generation strategy LE may be utilized to maximize the scale of synthetic pre-training data. In some example embodiments, there may be two alternative settings for generating synthetic data for pre-training. In a downstream-aware setting, it is possible to access to the label space of a downstream task for the pre-trained model, and thus the synthetic images 214 may be generated according to the label space of the downstream task (i.e., using the class names in the downstream task). In a downstream-agnostic, where there have no access to downstream tasks in the pre-training stage, and a relatively general and diverse label space may be utilized for synthetic data generation. For example, the class names may be collected from a reference label space in an available dataset. For pre-training methods, supervised pre-training or self-supervised pre-training method may be applied.

To validate the performances of using synthetic images for model pre-training, some example results according to some embodiments of the present disclosure are provided below. In some examples for downstream-aware setting, synthetic images of different sizes from a label space of a known label space (e.g., CIFAR-100), i.e. 1×, 2×, 3× ImageNet-1K data size, concretely 1.2 M, 2.4 M, 3.6 M, where ImageNet-1K is a reference label space for the downstream-agnostic setting. By pre-training the target model 220 on the generated synthetic labeled images in a supervised manner, and then performing evaluation after finetuning the model on the dataset CIFAR-100, the results are shown in Table 8.

TABLE 8

Example results on CIFAR-100 with downstream-aware supervised pre-training

| Data | pre-trained on IN-1k? | Syn. images amount | | | |
|---|---|---|---|---|---|
| | | 0 | 1.2M | 2.4M | 3.6M |
| (None) | N | 78.83 | — | — | — |
| C100 Syn | N | — | 83.90 | 85.03 | 85.24 |
| (None) | Y | 84.5 | — | — | — |
| C100 Syn | Y | — | 84.90 | 85.32 | 85.52 |

In Table 8, C100 refers to the dataset CIFAR-100, "C100 Syn" refers to synthetic data generated according to the label space of CIFAR-100, "IN-1K" refers to the dataset ImageNet-1K which is used or not used for pre-training in different cases. As shown in Table 8, with an equivalent amount of data as that of ImageNet-1K (1.2 M), synthetic data for pre-training can largely reduce the gap between training from scratch (78.83%) and ImageNet-pre-trained model (84.50%). Moreover, with 2× and 3× synthetic data, pre-training on synthetic data outperforms ImageNet-1K pre-training with a noticeable margin. In addition, when the model is initialized from ImageNet-1K pre-trained weights and pre-train the model on synthetic data, extra boosts can be obtained upon both results.

Therefore, for downstream-aware synthetic pre-training, synthetic data deliver close performance as that of real data (e.g., ImageNet-1K) pretraining with the same amount of data, synthetic data amount helps improve the results to outperforming the real data pre-training, and synthetic pre-training could further benefit from real data pre-training.

In some examples for downstream-agnostic setting, the syntenic data are generated with reference to a label space of an available dataset (e.g., ImageNet-1K) with 1× or 2× ImageNet-1K data size, i.e. 1.2 M/2.4 M IN-1K synthetic images. Supervised pretraining and self-supervised pre-training (i.e., Moco v2) of the target model 220 may be performed based on the generated synthetic data, and the pre-training results are evaluated by transferring to a first dataset (e.g., CIFAR-100) for an image classification task or a second dataset (e.g., PASCAL VOC) for an object detection task.

Table 9 shows example results on the dataset CIFAR-100 with downstream-agnostic supervised pretraining. Table 10 shows example results for object detection on the dataset PASCAL VOC with downstream-agnostic supervised pre-training. Table 11 shows example results for object detection on PASCAL VOC with downstream-agnostic self-supervised pre-training (Moco v2). In Table 9 to Table 11, "IN-1K Syn" refers to the same synthetic data amount (1.2 M) as the ImageNet-1K dataset, and "IN-2K Syn" refers to an increased synthetic data amount (2.4 M) as the ImageNet-1K dataset.

TABLE 9

Example results on CIFAR-100 with downstream-agnostic supervised pretraining

| Data | pre-trained on IN-1k? | Syn. images amount | | | |
|---|---|---|---|---|---|
| | | 0 | 1.2M | 2.4M | 4.0M |
| (None) | N | 69.29 | — | — | — |
| IN-1K Syn | N | — | 87.98 | 88.39 | — |
| IN-2K Syn | N | — | — | 88.57 | 88.91 |
| (None) | Y | — | 88.07 | — | — |

TABLE 10

Example results for object detection on PASCAL VOC with downstream-agnostic supervised pre-training

| Data | pre-trained on IN-1k? | Syn. images amount | | | |
|---|---|---|---|---|---|
| | | 0 | 1.2M | 2.4M | 4.0M |
| (None) | N | 66.08 | — | — | — |
| IN-1K Syn | N | — | 79.00 | 80.00 | — |
| IN-2K Syn | N | — | — | 80.54 | 80.72 |
| (None) | Y | 81.30 | — | — | — |
| IN-1K Syn | Y | — | — | 81.78 | — |
| IN-2K Syn | Y | — | — | 81.87 | 81.91 |

TABLE 11

Example results for object detection on PASCAL VOC with downstream-agnostic self-supervised pre-training (Moco v2)

| Data | pre-trained on IN-1k? | Syn. images amount | | | |
|---|---|---|---|---|---|
| | | 0 | 1.2M | 2.4M | 4.0M |
| (None) | N | 66.08 | — | — | — |
| IN-1K Syn | N | — | 81.55 | 82.13 | — |
| IN-2K Syn | N | — | — | 82.22 | 82.29 |
| (None) | Y | 82.44 | — | — | — |
| IN-1K Syn | Y | — | — | 82.47 | — |

As shown in Table 9 to Table 11, with 1.2 M IN-1K Syn, both supervised pre-training (79.00%) and self-supervised pre-training (81.55%) could largely approach their IN-1K Real counterparts (super.:81.3%; self-super.:82.44%) and largely outperforms the result without pre-training (66.08%). When increasing the data amount to 2.4 M, the transferred results further increase, and the unsupervised pre-training method, i.e. Moco v2, performs better in utilizing our synthetic data thanks to its independence of labels, yielding a 82.13% transferred performance which surpasses supervised pre-training on IN-1K Real (81.30%) and is on par with its Moco v2 counterpart at IN-1K Real (82.44%). Next, the label space is expanded by adding another 1K categories, producing IN-2KSyn. The enlarged diversity and data amount further bridge the gap between synthetic pre-training results and IN-1K Real pre-training results. Noticeably, the unsupervised pre-trained model Moco v2 (82.29%) largely approaches the IN-1K Real counterpart (82.44%) with negligible performance drop of 0.15%. Furthermore, when initialized from IN-1K Real pre-trained weights, both supervised and self-supervised pre-training improve upon both pure real data and synthetic data for pre-training.

According to the example embodiments for model pre-training, in terms of transfer abilities, synthetic data from text-to-image generation models show surprisingly promising results for model pre-training, which is comparable to the standard model pre-training methods. Through the embodiments, it is found that data amount has positive impacts on synthetic pre-training; performance could be improved by increasing synthetic data size, but would gradually saturate as the amount of data increases. Further, synthetic data for pre-training is orthogonal to real data for pre-training. For downstream-aware synthetic pre-training and downstream-agnostic synthetic pre-training, significant outperformance over the traditional pre-training methods can be achieved. In some example embodiments, for downstream-agnostic synthetic pre-training, self-supervised pre-training performs better than supervised pre-training. Besides, increasing the label space size could further improve the performance.

Figure 4:
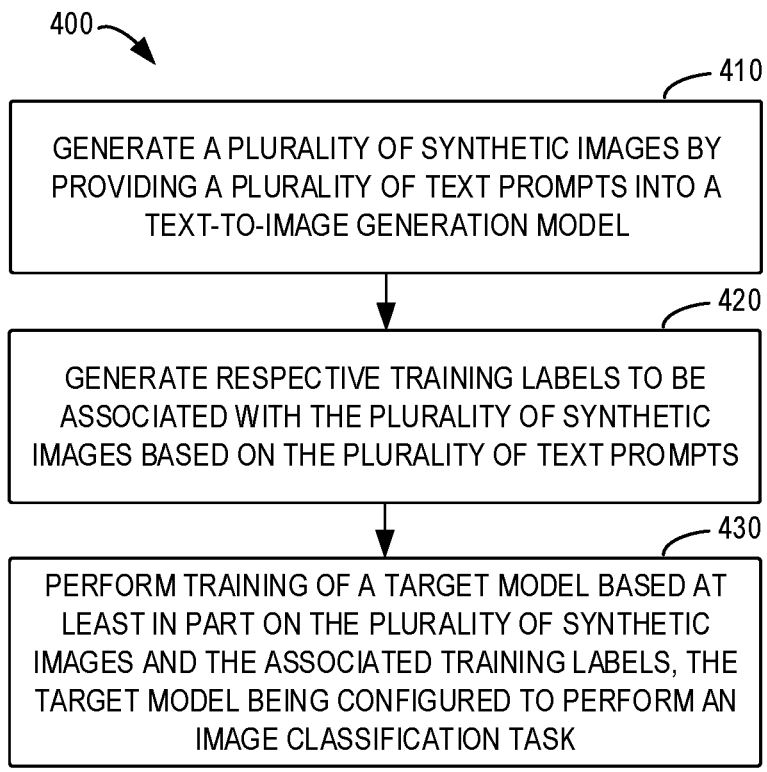
FIG. 4 illustrates a flowchart of a process for model training in accordance with some example embodiments of the present disclosure.

FIG. 4 illustrates a flowchart of a process 400 for model training in accordance with some example embodiments of the present disclosure. The process 400 may be implemented at the model training system 200 as illustrated in FIG. 2.

At block 410, the model training system 200 generates a plurality of synthetic images by providing a plurality of text prompts into a text-to-image generation model.

At block 420, the model training system 200 generates respective training labels to be associated with the plurality of synthetic images based on the plurality of text prompts.

At block 430, the model training system 200 performs training of a target model based at least in part on the plurality of synthetic images and the associated training labels, the target model being configured to perform an image classification task.

In some example embodiments, to perform the training of the target model, the model training system 200 may determine respective quality scores of the plurality of synthetic images; filter the plurality of synthetic images based on the determined respective quality scores, to discard at least one of the plurality of synthetic images; and perform the training of the target model based at least in part on the filtered synthetic images and the associated training labels.

In some example embodiments, to determine the respective quality scores of the plurality of synthetic images, the model training system 200 may provide the plurality of synthetic images into a pre-trained image classification model, respectively, to obtain a plurality of classification confidences generated by the pre-trained image classification model for the plurality of synthetic images; and determine the respective quality scores of the plurality of synthetic images based on the plurality of classification confidences.

In some example embodiments, the model training system 200 may perform the training of the target model using a soft cross-entropy (SCE) loss function.

In some example embodiments, the image classification task is configured to distinguish between a plurality of classes with a plurality of class names, and the associated training labels at least indicate the plurality of class names.

In some example embodiments, the model training system 220 may generate the plurality of text prompts through at least one of the following: filling at least one of the plurality of class names into a text template, to obtain at least one text prompt, or providing at least one of the plurality of class names into a trained word-to-sentence model, to obtain at least one text prompt generated by the word-to-sentence model.

In some example embodiments, the target model comprises a pre-trained model and the image classification task is a downstream task for the pre-trained model with zero-shot setting for the plurality of classes. In some example embodiments, to performing the training of the target model, the model training system 220 may fine-tune the pre-trained model based on the plurality of synthetic images and the associated training labels.

In some example embodiments, the target model comprises a pre-trained model and the image classification task is a downstream task for the pre-trained model with few-shot learning for the plurality of classes, each class having a number of non-synthetic images with associated training labels. In some example embodiments, to performing the training of the target model, the model training system 220 may fine-tune the pre-trained model based on the plurality of synthetic images and the associated training labels, and the non-synthetic images for the plurality of classes and the associated training labels.

In some example embodiments, to fine-tune the pre-trained model, the model training system 220 may filter the plurality of synthetic images by: for a first synthetic image associated with a first class, determining a first feature similarity between the first synthetic image and a first non-synthetic image in the first class, and a second feature similarity between the first synthetic image and a second non-synthetic image in a second class, and in accordance with a determination that the second feature similarity is higher than the first feature similarity, discarding the first synthetic image; and fine-tuning the pre-trained model based on the filtered synthetic images and the associated training labels, and the non-synthetic images and associated training labels.

In some example embodiments, the text-to-image generation model comprises a diffusion model. In some example embodiments, to generate the plurality of synthetic images, the model training system 200 may generate the plurality of synthetic images by further providing the non-synthetic images for the plurality of classes into the diffusion model as guidance information.

In some example embodiments, the model training system 200 may fine-tune the pre-trained model by: performing a phase-wise training procedure on the pre-trained model, the non-synthetic images being used for training in a first phase of the phase-wise training procedure, and the plurality of synthetic images being used for training in a second phase of the phase-wise training procedure, or performing a mix-training procedure on the pre-trained model by mixing the non-synthetic images and the plurality of synthetic images for training.

In some example embodiments, the pre-trained model comprises at least one batch normalization (BN) layer. The model training system 200 may fine-tune the pre-trained model with the at least one BN layer fixed.

In some example embodiments, to perform the training of the target model, the model training system 200 may pre-train the target model based at least in part on the plurality of synthetic images and the associated training labels. In some example embodiments, the image classification task is a downstream task after the pre-training.

Figure 5:
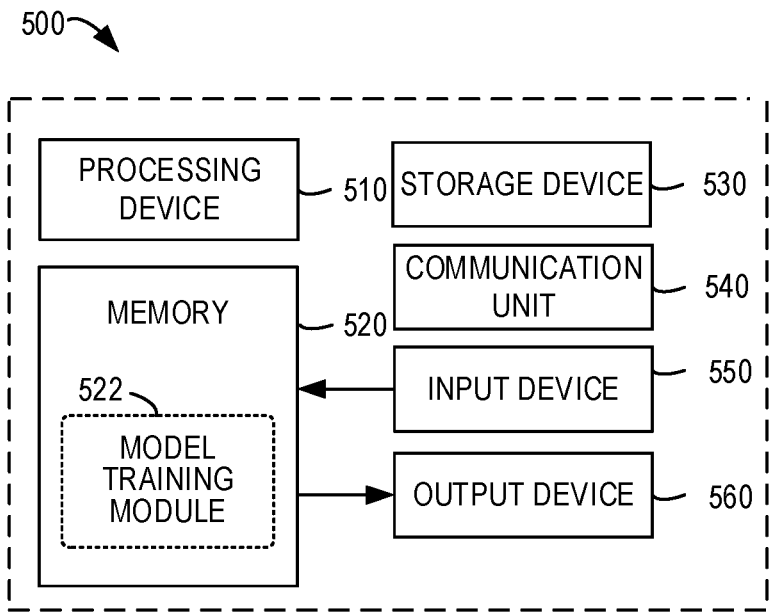
FIG. 5 illustrates a block diagram of an example computing system/device suitable for implementing example embodiments of the present disclosure.

FIG. 5 illustrates a schematic block diagram of a computing system/device 500 in which various embodiments of the present disclosure can be implemented. It would be appreciated that the computing system/device 500 as shown in FIG. 5 is merely provided as an example, without suggesting any limitation to the functionalities and scope of embodiments of the present disclosure.

As shown in FIG. 5, the computing system/device 500 is in form of a general-purpose computing device. Components of the computing system/device 500 may include, but are not limited to, one or more processors or processing devices 510, a memory 520, a storage device 530, one or more communication units 540, one or more input devices 550, and one or more output devices 560.

In some example embodiments, the computing system/device 500 may be implemented as a device with computing capability, such as a computing device, a computing system, a server, a mainframe and the like.

The processing device 510 can be a physical or virtual processor and can execute various processing based on the programs stored in the memory 520. In a multi-processor system, a plurality of processing units execute computer-executable instructions in parallel so as to enhance parallel processing capability of the computing system/device 500. The processing device 510 may include a central processing unit (CPU), a graphics processing unit (GPU), a microprocessor, a controller, and/or a microcontroller.

The computing system/device 500 usually includes various computer storage media. Such media may be any available media accessible by the computing system/device 500, including but not limited to, volatile and non-volatile media, or detachable and non-detachable media. The memory 520 may be a volatile memory (for example, a register, cache, Random Access Memory (RAM)), non-volatile memory (for example, a Read-Only Memory (ROM), Electrically Erasable Programmable Read-Only Memory (EEPROM), a flash memory), or any combination thereof. The storage device 530 may be any detachable or non-detachable medium and may include computer-readable medium such as a memory, a flash memory drive, a magnetic disk or any other media that can be used for storing information and/or data and are accessible by the computing system/device 500.

The computing system/device 500 may further include additional detachable/non-detachable, volatile/non-volatile memory media. Although not shown in FIG. 5, there may be provided a disk drive for reading from or writing into a detachable and non-volatile disk, and an optical disk drive for reading from and writing into a detachable non-volatile optical disc. In such cases, each drive may be connected to a bus (not shown) via one or more data medium interfaces.

The communication unit 540 implements communication with another computing device via the communication medium. In addition, the functionalities of components in the computing system/device 500 may be implemented by a single computing cluster or a plurality of computing machines that can communicate with each other via communication connections. Thus, the computing system/device 500 may operate in a networked environment using a logic connection with one or more other servers, network personal computers (PCs), or further general network nodes.

The input device 550 may include one or more of a variety of input devices, such as a mouse, keyboard, data import device and the like. The output device 560 may be one or more output devices, such as a display, data export device and the like. By means of the communication unit 540, the computing system/device 500 may further communicate with one or more external devices (not shown) such as storage devices and display devices, one or more devices that enable the user to interact with the computing system/device 500, or any devices (such as a network card, a modem and the like) that enable the computing system/device 500 to communicate with one or more other computing devices, if required. Such communication may be performed via input/output (I/O) interfaces (not shown).

In some example embodiments, as an alternative of being integrated on a single device, some or all components of the computing system/device 500 may also be arranged in the form of cloud computing architecture. In the cloud computing architecture, the components may be provided remotely and work together to implement the functionalities described in the present disclosure. In some example embodiments, cloud computing provides computing, software, data access and storage service, which will not require end users to be aware of the physical locations or configurations of the systems or hardware provisioning these services. In various embodiments, the cloud computing provides the services via a wide area network (such as Internet) using proper protocols. For example, a cloud computing provider provides applications over the wide area network, which may be accessed through a web browser or any other computing components. The software or components of the cloud computing architecture and corresponding data may be stored in a server at a remote position. The computing resources in the cloud computing environment may be aggregated or distributed at locations of remote data centers. Cloud computing infrastructure may provide the services through a shared data center, though they behave as a single access point for the users. Therefore, the cloud computing infrastructure may be utilized to provide the components and functionalities described herein from a service provider at remote locations. Alternatively, they may be provided from a conventional server or may be installed directly or otherwise on a client device.

The computing system/device 500 may be used to implement resource management in accordance with various embodiments of the present disclosure. The memory 520 may include one or more modules having one or more program instructions. These modules may be accessed and run by the processing unit 510 to perform functions of various embodiments described herein. For example, the memory 520 may include a model training module 522 for performing model training in accordance with the example embodiments of the present disclosure. As shown in FIG. 5, the computing system/device 500 may obtain an input required for model training through the input device 550 and provide the corresponding output through the output device 560. In some example embodiments, the computing system/device 500 may further receive an input from other devices (not shown) via the communication unit 540.

In some example embodiments of the present disclosure, there is provided a computer program product comprising instructions which, when executed by a processor of an apparatus, cause the apparatus to perform steps of any one of the methods described above.

In some example embodiments of the present disclosure, there is provided a non-transitory computer readable medium comprising program instructions for causing an apparatus to perform at least steps of any one of the methods described above. The computer readable medium may be a non-transitory computer readable medium in accordance with some embodiments.

Generally, various example embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of the example embodiments of the present disclosure are illustrated and described as block diagrams, flowcharts, or using some other pictorial representations, it will be appreciated that the blocks, apparatuses, systems, techniques, or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods/processes as described above. Generally, program modules include routines, programs, libraries, objects, classes, components, data structures, or the like that perform particular tasks or implement particular abstract types. The functionality of the program modules may be combined or split between program modules as desired in various embodiments. Computer-executable instructions for program modules may be executed within a local or distributed device. In a distributed device, program modules may be located in both local and remote storage media.

The computer readable medium may be a computer readable signal medium or a computer readable storage medium. A computer readable medium may include but is not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Computer program code for carrying out methods disclosed herein may be written in any combination of one or more programming languages. The program code may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a computer, partly on the computer, as a stand-alone software package, partly on the computer and partly on a remote computer or entirely on the remote computer or server. The program code may be distributed on specially-programmed devices which may be generally referred to herein as "modules". Software component portions of the modules may be written in any computer language and may be a portion of a monolithic code base, or may be developed in more discrete code portions, such as is typical in object-oriented computer languages. In addition, the modules may be distributed across a plurality of computer platforms, servers, terminals, mobile devices and the like. A given module may even be implemented such that the described functions are performed by separate processors and/or computing hardware platforms.

While operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method comprising:
generating a plurality of synthetic images by providing a plurality of text prompts into a text-to-image generation model;
generating respective training labels to be associated with the plurality of synthetic images based on the plurality of text prompts; and
performing training of a target model based at least in part on the plurality of synthetic images and the associated training labels, the target model being configured to perform an image classification task.

2. The method of claim 1, wherein performing the training of the target model comprises:
determining respective quality scores of the plurality of synthetic images;
filtering the plurality of synthetic images based on the determined respective quality scores, to discard at least one of the plurality of synthetic images; and
performing the training of the target model based at least in part on the filtered synthetic images and the associated training labels.

3. The method of claim 2, wherein determining the respective quality scores of the plurality of synthetic images comprises:
providing the plurality of synthetic images into a pre-trained image classification model, respectively, to obtain a plurality of classification confidences generated by the pre-trained image classification model for the plurality of synthetic images; and
determining the respective quality scores of the plurality of synthetic images based on the plurality of classification confidences.

4. The method of claim 1, wherein performing the training of the target model comprises:
performing the training of the target model using a soft cross-entropy (SCE) loss function.

5. The method of claim 1, wherein the image classification task is configured to distinguish between a plurality of classes with a plurality of class names, and the associated training labels at least indicate the plurality of class names.

6. The method of claim 5, further comprising:
generating the plurality of text prompts through at least one of the following:
filling at least one of the plurality of class names into a text template, to obtain at least one text prompt, or
providing at least one of the plurality of class names into a trained word-to-sentence model, to obtain at least one text prompt generated by the word-to-sentence model.

7. The method of claim 5, wherein the target model comprises a pre-trained model and the image classification task is a downstream task for the pre-trained model with zero-shot setting for the plurality of classes, and wherein performing the training of the target model comprises:
fine-tuning the pre-trained model based on the plurality of synthetic images and the associated training labels.

8. The method of claim 5, wherein the target model comprises a pre-trained model and the image classification task is a downstream task for the pre-trained model with few-shot learning for the plurality of classes, each class having a number of non-synthetic images with associated training labels, and wherein performing the training of the target model comprises:
fine-tuning the pre-trained model based on the plurality of synthetic images and the associated training labels, and the non-synthetic the associated training labels for the plurality of classes.

9. The method of claim 8, wherein fine-tuning the pre-trained model comprises:
    filtering the plurality of synthetic images by:
        for a first synthetic image associated with a first class, determining a first feature similarity between the first synthetic image and a first non-synthetic image in the first class, and a second feature similarity between the first synthetic image and a second non-synthetic image in a second class, and
        in accordance with a determination that the second feature similarity is higher than the first feature similarity, discarding the first synthetic image; and
    fine-tuning the pre-trained model based on the filtered synthetic images and the associated training labels, and the non-synthetic images with the associated training labels.

10. The method of claim 8, wherein the text-to-image generation model comprises a diffusion model, and generating the plurality of synthetic images comprises:
    generating the plurality of synthetic images by further providing the non-synthetic images for the plurality of classes into the diffusion model as guidance information.

11. The method of claim 8, wherein fine-tuning the pre-trained model comprises:
    fine-tuning the pre-trained model by:
        performing a phase-wise training procedure on the pre-trained model, the non-synthetic images being used for training in a first phase of the phase-wise training procedure, and the plurality of synthetic images being used for training in a second phase of the phase-wise training procedure, or
        performing a mix-training procedure on the pre-trained model by mixing the non-synthetic images and the plurality of synthetic images for training.

12. The method of claim 8, wherein the pre-trained model comprises at least one batch normalization (BN) layer, and wherein fine-tuning the pre-trained model comprises:
    fine-tuning the pre-trained model with the at least one BN layer fixed.

13. The method of claim 1, wherein performing the training of the target model comprises:
    pre-training the target model based at least in part on the plurality of synthetic images and the associated training labels, and
    wherein the image classification task is a downstream task after the pre-training.

14. A system, comprising:
    at least one processor; and
    at least one memory communicatively coupled to the at least one processor and comprising computer-readable instructions that upon execution by the at least one processor cause the at least one processor to perform acts comprising:
        generating a plurality of synthetic images by providing a plurality of text prompts into a text-to-image generation model;
        generating respective training labels to be associated with the plurality of synthetic images based on the plurality of text prompts; and
        performing training of a target model based at least in part on the plurality of synthetic images and the associated training labels, the target model being configured to perform an image classification task.

15. The system of claim 14, wherein performing the training of the target model comprises:
    determining respective quality scores of the plurality of synthetic images;
    filtering the plurality of synthetic images based on the determined respective quality scores, to discard at least one of the plurality of synthetic images; and
    performing the training of the target model based at least in part on the filtered synthetic images and the associated training labels.

16. The system of claim 15, wherein determining the respective quality scores of the plurality of synthetic images comprises:
    providing the plurality of synthetic images into a pre-trained image classification model, respectively, to obtain a plurality of classification confidences generated by the pre-trained image classification model for the plurality of synthetic images; and
    determining the respective quality scores of the plurality of synthetic images based on the plurality of classification confidences.

17. The system of claim 14, wherein the image classification task is configured to distinguish between a plurality of classes with a plurality of class names, and the associated training labels at least indicate the plurality of class names.

18. The system of claim 17, further comprising:
    generating the plurality of text prompts through at least one of the following:
        filling at least one of the plurality of class names into a text template, to obtain at least one text prompt, or
        providing at least one of the plurality of class names into a trained word-to-sentence model, to obtain at least one text prompt generated by the word-to-sentence model.

19. The system of claim 17, wherein the target model comprises a pre-trained model and the image classification task is a downstream task for the pre-trained model with zero-shot setting for the plurality of classes, and wherein performing the training of the target model comprises:
    fine-tuning the pre-trained model based on the plurality of synthetic images and the associated training labels; or
    wherein the target model comprises a pre-trained model and the image classification task is a downstream task for the pre-trained model with few-shot learning for the plurality of classes, each class having a number of non-synthetic images with associated training labels, and wherein performing the training of the target model comprises:
    fine-tuning the pre-trained model based on the plurality of synthetic images and the associated training labels, and the non-synthetic images the associated training labels for the plurality of classes.

20. A non-transitory computer-readable storage medium, storing computer-readable instructions that upon execution by a device cause the device to perform acts comprising:
    generating a plurality of synthetic images by providing a plurality of text prompts into a text-to-image generation model;
    generating respective training labels to be associated with the plurality of synthetic images based on the plurality of text prompts; and
    performing training of a target model based at least in part on the plurality of synthetic images and the associated training labels, the target model being configured to perform an image classification task.

* * * * *